US011302135B1

(12) United States Patent
Lv et al.

(10) Patent No.: US 11,302,135 B1
(45) Date of Patent: Apr. 12, 2022

(54) APPARATUS FOR SELLING CIGARETTES AND SYSTEM FOR ACCESSING CIGARETTES

(71) Applicant: HONGYUNHONGHE TOBACCO (GROUP) CO., LTD, Yunan (CN)

(72) Inventors: Xianzhou Lv, Yunan (CN); Yingkui Zhou, Yunan (CN); Dan Lin, Yunan (CN); Faqing Lv, Yunan (CN); Huidong Yao, Yunan (CN); Lei Chai, Yunan (CN); Ming Zhu, Yunan (CN); Qiyong Xu, Yunan (CN); Bing Liu, Yunan (CN); Haize Zhao, Yunan (CN); Lin Qi, Yunan (CN); Yilong Jin, Yunan (CN); Shixiang Zhang, Yunan (CN); Jianguo Fang, Yunan (CN); Tao Hu, Yunan (CN); Liang Cheng, Yunan (CN); Qiang Jin, Yunan (CN); Shuanggui Li, Yunan (CN); Yun Li, Yunan (CN); Xishu Tang, Yunan (CN)

(73) Assignee: HONGYUNHONGHE TOBACCO GROUP CO, LTD, Yunan (CN)

( * ) Notice: Subject to any disclaimer, the term of this patent is extended or adjusted under 35 U.S.C. 154(b) by 0 days.

(21) Appl. No.: 17/251,150

(22) PCT Filed: May 9, 2020

(86) PCT No.: PCT/CN2020/089326
§ 371 (c)(1),
(2) Date: Dec. 10, 2020

(87) PCT Pub. No.: WO2021/226739
PCT Pub. Date: Nov. 18, 2021

(51) Int. Cl.
*G07F 11/42* (2006.01)
*G07F 11/72* (2006.01)
(Continued)

(52) U.S. Cl.
CPC ........... *G07F 11/42* (2013.01); *F24F 7/06* (2013.01); *G07F 11/16* (2013.01); *G07F 11/58* (2013.01); *G07F 11/72* (2013.01)

(58) Field of Classification Search
None
See application file for complete search history.

(56) References Cited

U.S. PATENT DOCUMENTS 8,712,586 B2 * 4/2014 Allinson ............. G07F 17/0092
700/242

FOREIGN PATENT DOCUMENTS

CN 102651089 A 8/2012
CN 204896852 U 12/2015
(Continued)

OTHER PUBLICATIONS

Chinese Office Action issued in 202010386143.6 dated Aug. 4, 2021, 14 pages.
(Continued)

*Primary Examiner* — Gene O Crawford
*Assistant Examiner* — Ayodeji T Ojofeitimi
(74) *Attorney, Agent, or Firm* — Zhong Law, LLC

(57) ABSTRACT

An apparatus for selling cigarettes and a system for accessing cigarettes are described herein. The apparatus comprises a vending machine and a smoke purification system. The smoke purification system includes a housing, an extraction device, a smoke purifier, and an exhaustion device. An upper face of the housing is provided with an air inlet for sucking in air in an upper space of a smoking room, and a front face of the housing is provided with a fresh air outlet. An intake port of the extraction device is coupled with the air inlet, an escape port of the exhaustion device is coupled with the fresh air outlet through an exhaust channel, and two ends of the smoke purifier are coupled with an escape port of the (Continued)

extraction device and an intake port of the exhaustion device, respectively.

16 Claims, 11 Drawing Sheets

(51) Int. Cl.
    *G07F 11/58*     (2006.01)
    *F24F 7/06*     (2006.01)
    *G07F 11/16*     (2006.01)

(56) References Cited

FOREIGN PATENT DOCUMENTS

| | | |
|---|---|---|
| CN | 105405209 A | 3/2016 |
| CN | 206696943 U | 12/2017 |
| CN | 107767167 A | 3/2018 |
| CN | 207409051 U | 5/2018 |
| CN | 109064648 A | 12/2018 |
| CN | 208985249 U | 6/2019 |
| CN | 110060413 A | 7/2019 |
| CN | 209080645 U | 7/2019 |
| CN | 209859218 U | 12/2019 |
| CN | 209942286 U | 1/2020 |
| CN | 210028616 U | 2/2020 |
| CN | 210377653 U | 4/2020 |
| CN | 111127752 A | 5/2020 |
| ES | 2011104 A6 | 12/1989 |
| JP | 2002150396 A | 5/2002 |
| KR | 20110000642 U | 1/2011 |
| KR | 101337152 B1 | 12/2013 |

OTHER PUBLICATIONS

Search Report issued in PCT/CN2020/089326 dated Jan. 12, 2021, 8 pages.

\* cited by examiner

APPARATUS FOR SELLING CIGARETTES AND SYSTEM FOR ACCESSING CIGARETTES

CROSS-REFERENCE TO RELATED APPLICATIONS

This application is the National Stage Entry under 35 U.S.C. § 371 of Patent Cooperation Treaty Application No. PCT/CN2020/089326, filed May 9, 2020, the disclosure of which is herein incorporated by reference in its entirety.

TECHNICAL FIELD

The disclosure relates to the technical field of cigarettes and, in particular, to an apparatus for selling cigarettes and a system for accessing cigarettes.

BACKGROUND

Currently, in public places such as passenger stations and railway stations, specific smoking rooms are provided for smoking. Particularly, in airports, non-smoking factories and other non-smoking places, it is strictly forbidden to carry cigarettes and lighters, and therefore smokers may not be able to smoke for a long time. In addition, if the smokers go to a store outside to buy a pack of cigarettes, it is too wasteful not to smoke all of them. Thus, a cigarette vending machine is required. However, since a smoking room may be full of smoke leading to very low air quality, and a conventional cigarette vending machine can only provide a function of selling cigarettes, the smokers and management personnel are vulnerable to secondhand smoke.

SUMMARY

The objective of the present disclosure is to describe an apparatus for selling cigarettes to solve the problem in the prior art that smokers and the management personnel are very vulnerable to the secondhand smoke. The disclosure also describes a system for accessing cigarettes.

In order to achieve the above objective, an apparatus for selling cigarettes may comprise a vending machine and a smoke purification system disposed at the top of the vending machine. The smoke purification system includes a housing, an extraction device, a smoke purifier for removing smoke, and an exhaustion device. The extraction device, the smoke purifier, and the exhaustion device are disposed within the housing. An upper face of the housing comprises an air inlet for sucking in air in an upper space of a smoking room, and a front face of the housing comprises a fresh air outlet. An intake port of the extraction device is coupled with the air inlet, an escape port of the exhaustion device is coupled with the fresh air outlet through an exhaust channel, and two ends of the smoke purifier are coupled with an escape port of the extraction device and an intake port of the exhaustion device, respectively.

Optionally, the vending machine comprises a cigarette reservoir and a control cabinet disposed laterally to the cigarette reservoir. A front face of the control cabinet is provided with a touch-screen display, a camera located above the touch-screen display, and an ID card scanner located below the touch-screen display. A controller electrically connected to the touch-screen display, the camera, and the ID card scanner is disposed within the control cabinet, and a front face of the cigarette reservoir is provided with a cigarette outlet. A cigarette basket is provided at the cigarette outlet, one side of the cigarette basket being provided with an opening coupled with the cigarette outlet, and an upper end of the cigarette basket being provided with a cigarette exit. A chute is disposed within the cigarette reservoir, a base plate of the chute being inclined downwardly, and the chute extending through the cigarette outlet into the cigarette basket. A discharge device for discharging the cigarettes is disposed within the cigarette reservoir, the discharge device being electrically connected to the controller, and a discharge opening of the discharge device being located directly above the chute.

Optionally, the discharge device comprises a storage box vertically disposed on an inner wall of the cigarette reservoir, a first roller, and a second roller. The storage box includes a tank, a push cylinder, a storage channel, and a discharge cylinder that are coupled with one another sequentially from top to bottom. The top of the storage box is provided with a storage opening, the bottom of the discharge cylinder is provided with the discharge opening, and the first roller has a diameter larger than that of the second roller. The first roller is disposed within the push cylinder. Four cigarette holding grooves are evenly distributed on an outer periphery of the first roller, each cigarette holding groove used to hold a cigarette and extending in an axial direction of the first roller. The first roller is rotatably matched with an inner periphery of the push cylinder, and a right end of the first roller is connected with a drive mechanism that may be used for driving the first roller to rotate. The second roller is disposed within the discharge cylinder. A cigarette transferring groove is disposed on an outer periphery of the second roller and extends in an axial direction of the second roller. The second roller is rotatably matched with an inner periphery of the discharge cylinder, the drive mechanism configured to drive the second roller to rotate be electrically connected with the controller.

Optionally, four spring holding grooves parallel to and adjacent to the cigarette holding grooves are evenly distributed on the outer periphery of the first roller. A spring is disposed within each spring holding groove, one end of the spring being connected to the bottom of the spring holding groove, the other end of the spring being connected to the bottom of a push block, and a side of the push block away from the cigarette holding groove being formed as an inclined surface.

Optionally, the drive mechanism comprises a first motor, a first pulley, and a second pulley. The first pulley has a diameter greater than that of the second pulley, the first pulley being fixedly disposed on a rotation shaft at the right end of the first roller, the second pulley being fixedly disposed on a rotation shaft at a right end of the second roller, and the first pulley and the second pulley being connected via a timing belt. An output shaft of the first motor is coaxially connected with the rotation shaft at the right end of the second roller, and the first motor is electrically connected with the controller.

Optionally, the discharge device comprises at least two discharge devices, each discharge device having a storage box for a different specification of cigarettes. The storage box is connected to a chassis by a support structure, one end of the chassis being connected to the inner wall of the cigarette reservoir, and the chute being disposed on the chassis.

Optionally, the drive mechanism comprises a second motor, a third pulley, and a fourth pulley. A first roller of each discharge device is fixedly disposed on a first rotation shaft, a second roller of each discharge device is slidably sleeved on a second rotation shaft, and the third pulley is fixedly disposed on a right end of the first rotation shaft. The fourth pulley is fixedly disposed on a right end of the second rotation shaft. The third pulley and the fourth pulley are connected via a timing belt, the third pulley having a diameter larger than that of the fourth pulley. An output shaft of the second motor is coaxially connected with the second rotation shaft, the second motor is electrically connected to the controller, and a plurality of clutch bosses are disposed on a face of the right end of the second roller. A clutch disk is fixedly disposed on the second rotation shaft and located between two adjacent second rollers. A plurality of holes to be matched with the clutch bosses are disposed on the clutch disk. A left end of the second roller is provided with a tie plate protruding from the outer periphery of the second roller, an air cylinder is disposed on the chassis in parallel with the second roller, and a piston of the air cylinder is perpendicularly connected to one end of a tie rod. The air cylinder is electrically connected to the controller, and the other end of the tie rod is provided with a U-shaped limit slot for accommodating the tie plate.

Optionally, a cigarette lighter and a faucet are provided on the front face of the control cabinet below the ID card scanner, respectively. A clean water tank is provided within the control cabinet, and a water inlet of the faucet is connected to the bottom of the clean water tank. The control cabinet is provided with a cigarette butt bin on which a cigarette butt inlet is disposed. An upper end of the cigarette butt inlet is provided with a water opening aligned with the faucet, a waste channel inclined downwardly is provided inside the cigarette butt inlet, and the water opening is coupled with the inside of the cigarette butt bin through the waste channel.

Optionally, a plurality of exhaust grilles inclined downwardly are evenly distributed at the fresh air outlet, a sachet being disposed within the exhaust channel.

A system may be provided for accessing cigarettes. The system may comprise a central control module, an authentication module for identification, a cigarette selection module, a payment module, and a big data collection module. The authentication module, the cigarette selection module, the payment module, and the big data collection module are communicatively coupled with the central control module. The cigarette selection module may be used for a smoker to perform a cigarette selection operation, the payment module may be used for the smoker to perform a payment operation, and the big data collection module may be used for collecting information regarding a placement point of a cigarette selling apparatus, ages of smokers, and the number of cigarettes of various brands consumed by the smokers.

Beneficial effects of the apparatus and systems described herein may include, by using the smoke purification system disposed on the top of the vending machine, sucking in smoke in the smoking room, removing the smoke via the smoke purifier in the smoke purification system, and then discharging fresh air into the smoking room, thereby purifying the air in the smoking room, improving air quality in the smoking room, and effectively reducing the harm of secondhand smoke to the smokers and the management personnel.

BRIEF DESCRIPTION OF THE DRAWINGS

Embodiments of the present application or technical solutions in the prior art are explained in greater detail below with reference to the drawings required to be used for the embodiments, in which.

DETAILED DESCRIPTION

Figure 1:
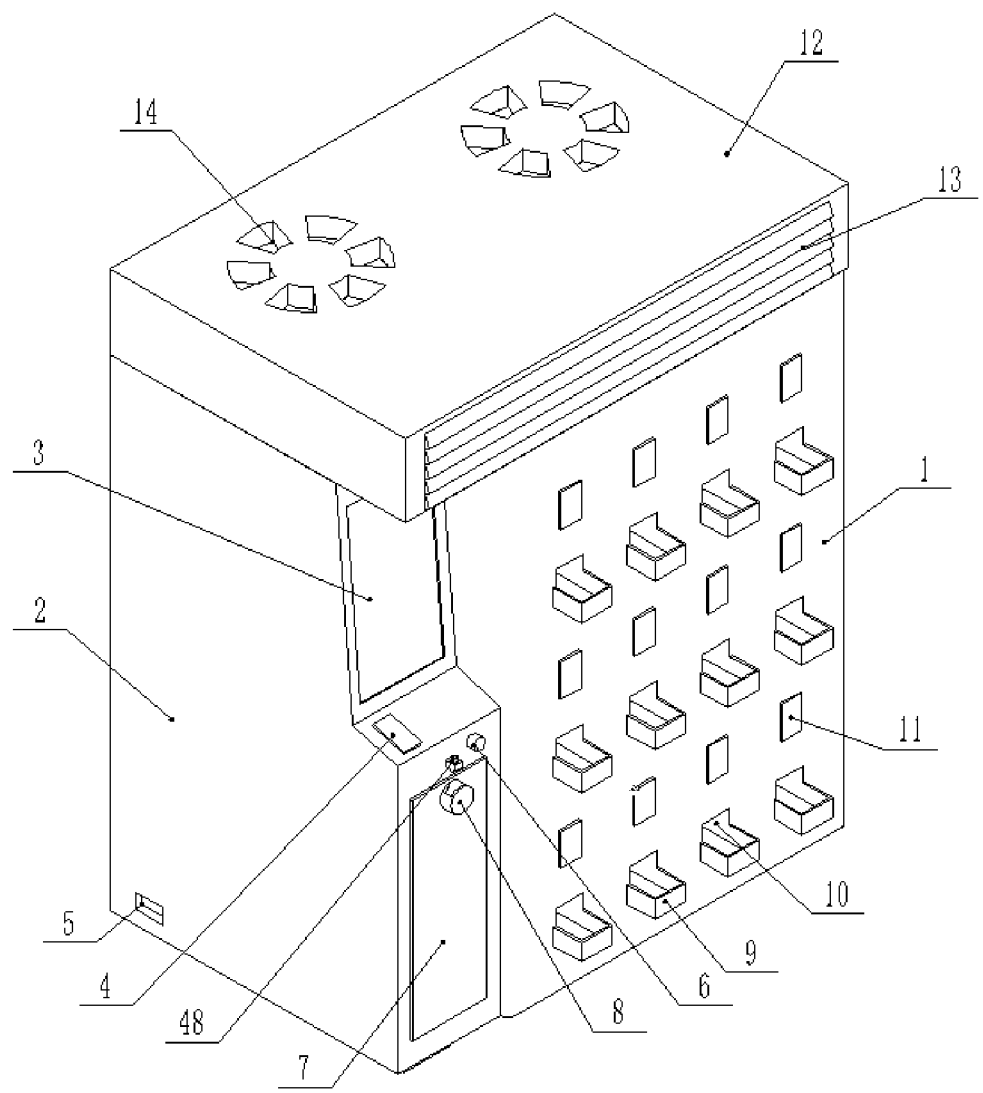
FIG. 1 is a schematic diagram of an apparatus for selling cigarettes in accordance with an embodiment described herein.
Figure 2:
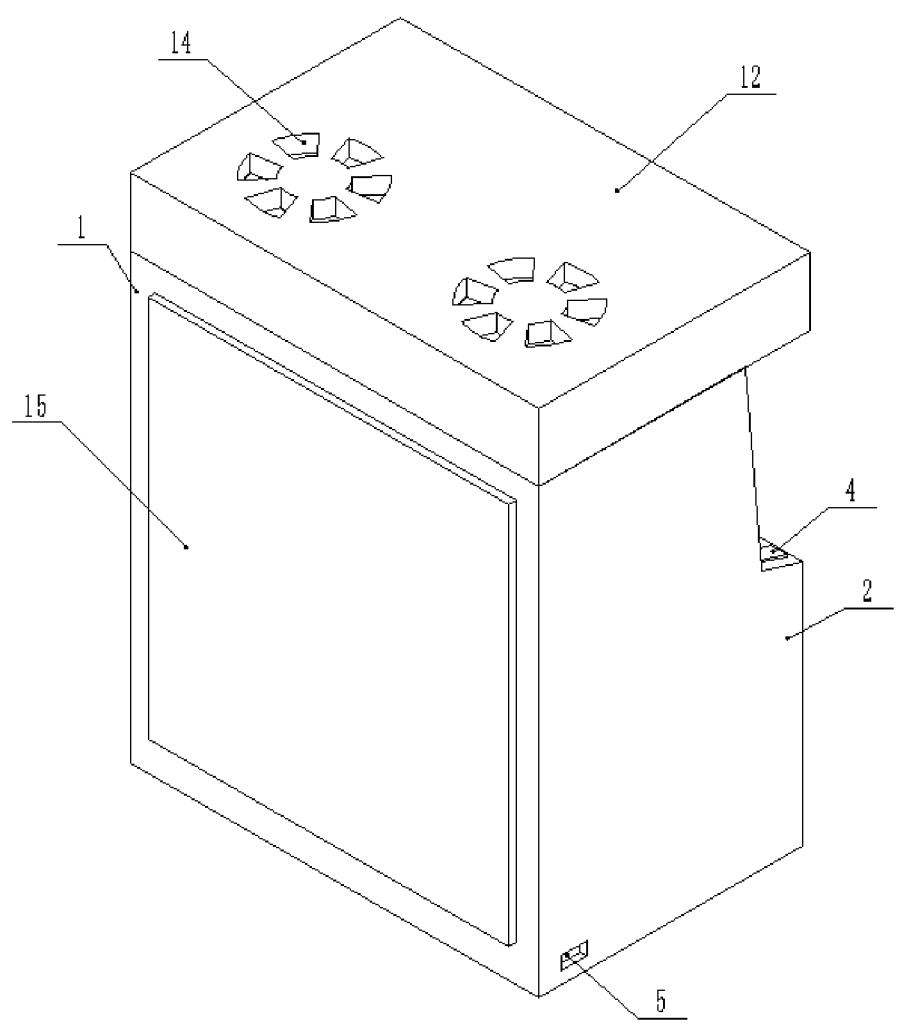
FIG. 2 is another schematic diagram of an apparatus for selling cigarettes in accordance with an embodiment described herein.

In order to enable those skilled in the art to better understand the technical solutions described herein, the technical solutions will be further described in detail below with reference to specific embodiments.

The following reference numbers are used in the drawings to indicate various parts or components described herein: 1. Cigarette reservoir; 2. Control cabinet; 3. Touch-screen display; 4. ID card scanner; 5. Power socket; 6. Cigarette lighter; 7. Cigarette butt bin; 8. Cigarette butt inlet; 9. Cigarette basket; 10. Chute; 11. Cigarette brand label; 12. Smoke purification system; 13. Fresh air outlet; 14. Air inlet; 15. Door; 16. Camera; 17. Foot holder; 18. Cap; 19. Storage box; 20. Bracket; 21. Laser sensor; 22. First pulley; 23. Timing belt; 24. First motor; 25. Second pulley; 26. Chassis; 27. First roller; 28. Push block; 29. Cigarette holding groove; 30. Second roller; 31. Cigarette transferring groove; 32. Spring holding groove; 33. Spring; 34. Cigarette holding groove baffle; 35. First rotation shaft; 36. Extraction device; 37. Smoke purifier; 38. Exhaustion device; 39. Sachet; 40. Clutch disc; 41. Tie rod; 42. Air cylinder; 43. Air cylinder bracket; 44. Reinforcement rod; 45. Second rotation shaft; 46. Clutch bosses; 47. Tie plate; 48. Faucet; 190. Storage opening; 191. Tank; 192. Push cylinder; 193. Storage channel; 194. Discharge cylinder; 195. Discharge opening; 51. Second motor; 52. Fourth pulley.

As shown in FIGS. 1 to 3 and FIG. 14, an apparatus for selling cigarettes includes a vending machine and a smoke purification system 12 disposed at the top of the vending machine. The smoke purification system includes a housing, an extraction device 36, a smoke purifier 37 for removing smoke, and an exhaustion device 38. An upper face of the housing is provided with an air inlet 14 for sucking in air in an upper space of a smoking room, and a front face of the housing is provided with a fresh air outlet 13. The extraction device 36, the exhaustion device, and the smoke purifier 37 are disposed within the housing. An intake port of the extraction device is coupled with the air inlet, and an escape port of the exhaustion device is coupled with the fresh air outlet through an exhaust channel. The ends of the smoke purifier 37 are coupled with an escape port of the extraction device 36 and an intake port of the exhaustion device 38, respectively.

The apparatus for selling cigarettes can be used for, by disposing the smoke purification system 12 on the top of the vending machine, sucking in smoke in the smoking room, removing the smoke via the smoke purifier 37 in the smoke purification system 12, and discharging fresh air into the smoking room, thereby purifying air in the smoking room, improving air quality in the smoking room, and effectively reducing the harm of secondhand smoke to smokers and management personnel.

The vending machine described herein includes a cigarette reservoir 1 and a control cabinet 2 disposed laterally to the cigarette reservoir 1. A front face of the control cabinet 2 is provided with a touch-screen display 3, a camera 16 located above the touch-screen display, and an ID card scanner 4 located below the touch-screen display. A controller electrically connected to the touch-screen display, the camera, and the ID card scanner respectively is disposed within the control cabinet. A front face of the cigarette reservoir is provided with a cigarette outlet. A cigarette basket 9 is provided at the cigarette outlet, one side of the cigarette basket 9 being provided with an opening coupled the cigarette outlet, and an upper end of the cigarette basket being provided with a cigarette exit. A chute 10 is provided within the cigarette reservoir, a base plate of the chute 10 being inclined downwardly, and the chute extending through the cigarette outlet into the cigarette basket. A discharge device for discharging cigarettes is provided within the cigarette reservoir, the discharge device being electrically connected to the controller, and a discharge opening 195 of the discharge device being located directly above the chute. In an embodiment, facial information of a smoker is acquired via the camera. An ID card of the smoker is placed on the ID card scanner for identification of the smoker or an ID number of the smoker is entered from the touch-screen display by the smoker, so as to authenticate the smoker. For the purpose of prohibiting minors from buying cigarettes, the smoker can buy the cigarettes only after he/she is authenticated, such that the smoker to buy the cigarettes is an adult. The discharge device has a cigarette drop in the chute through the discharge opening, and then the cigarette slides from the base plate of the chute to the cigarette basket owing to its own gravity, such that the smoker can take the cigarette out of the cigarette exit.

Specifically, a plurality of cigarette basket 9 can be provided on the cigarette reservoir 1. An outer wall of the cigarette reservoir can be provided with a cigarette brand label 11 above each cigarette basket 9, and the cigarette brand label 11 can adopt an electronic display showing a cigarette brand on the cigarette brand label 11. The cigarette brand label 11 is fixed on the front face of the cigarette reservoir 1, and the cigarette brand label 11 has a custom function for easy operation. When the cigarette brand needs to be changed due to sales statistics or because production of the brand has been stopped, it is convenient for management personnel with administrator rights to handle content showing on the electronic display. A rear end of the cigarette reservoir 1 is equipped with a door 15 hingedly connected with the cigarette reservoir. Generally, the door is locked to the cigarette reservoir by a door lock, and only a worker who replenishes cigarettes can open the door. The cigarette reservoir can be a cuboid structure, and each of four corners of the bottom of the cigarette reservoir 1 can be equipped with a foot holder 17.

As shown in FIGS. 4 to 13, the discharge device includes a storage box 19, a first roller 27, and a second roller 30. The storage box is vertically disposed on an inner wall of the cigarette reservoir. The storage box includes a tank 191, a push cylinder 192, a storage channel 193, and a discharge cylinder 194 that are coupled with one another sequentially from top to bottom. The top of the storage box is provided with a storage opening 190, and the bottom of the discharge cylinder is provided with the discharge opening 195. The first roller has a diameter larger than that of the second roller. The first roller is disposed within the push cylinder, and four cigarette holding grooves 29 are evenly distributed on an outer periphery of the first roller. Each cigarette holding groove 29 is used to hold a cigarette and extends in an axial direction of the first roller. The first roller is rotatably matched with an inner periphery of the push cylinder, and a right end of the first roller is connected with a drive mechanism which can be used for driving the first roller to rotate. The second roller is disposed within the discharge cylinder, and an outer periphery of the second roller is provided with a cigarette transferring groove 31 extending in an axial direction of the second roller. The second roller is rotatably matched with an inner periphery of the discharge cylinder. The drive mechanism can drive the second roller to rotate. The drive mechanism is electrically connected with the controller. In an embodiment, when the controller controls the drive mechanism to operate, the first roller 27 rotates, such that cigarettes in the cigarette holding grooves rotate accordingly. When one of the cigarette holding grooves is aligned with the storage channel, a cigarette in the one of the cigarette holding groove falls into the storage channel, and when the cigarette transferring groove on the second roller 30 is aligned with the storage channel, the cigarette in the storage channel falls into the cigarette transferring groove. As the second roller 30 is rotated, the cigarette transferring groove is going to be aligned with the discharge opening, such that the cigarette in the cigarette transferring groove is going to fall into the chute through the discharge opening, and then fall into the cigarette basket. The cigarette can then be taken out. It is understandable that only one cigarette, not two cigarettes side by side, can pass through the storage channel. That is, the storage channel has a length equal to or greater than that of a cigarette and a width equal to or greater than the diameter of the cigarette. The storage channel may have a width greater than the diameter of one cigarette but less than the diameter of two cigarettes. The storage box can be an integrated structure, the tank 191 has a lower part with a tapered cross section, and two ends of the storage channel 193 are connected to the middle of the push cylinder 192 and the middle of the discharge cylinder 194, respectively. Cigarettes that fall into the storage channel 193 are temporarily stored and ready to be removed by the second roller 30.

Specifically, four spring holding grooves 32 parallel to and adjacent to the cigarette holding grooves are evenly distributed on the outer periphery of the first roller 27. A spring 33 is disposed within each spring holding groove, one end of the spring 33 is connected to the bottom of the spring holding groove, and the other end of the spring is connected to the bottom of a push block 28. A side of the push block away from the cigarette holding groove is formed as an inclined surface. In an embodiment, when the first roller rotates, the inclined surface on the push projection 28 retracts inward when it gets into contact with an inner wall of the push cylinder 192, and pops out when it is not in contact with the inner wall of the push cylinder 192, thereby pushing cigarettes in the tank 191 and avoiding cigarette jams. As a result, the cigarettes can be smoothly dropped into the cigarette holding grooves 29. It is understandable that the push blocks 28 can be completely retracted in the spring holding grooves 32 and the push blocks are located in front of the cigarette holding grooves in a rotation direction of the first roller.

Further, a laser sensor 21 can be installed on a side wall of the tank 191, electrically connected to the controller, and adopts a background suppression type laser photoelectric sensor. The laser sensor 21 can detect whether there are cigarettes at a certain height of the storage box 19, and then the number of cigarettes in the storage box 19 can be judged. When the cigarettes in the storage box 19 are less than a certain amount, a signal is sent to the controller to remind the worker to add cigarettes into the storage box 19. The tank 191 can be covered by a cap 18. The storage box 19 can be fixedly installed on an inner side wall of the cigarette reservoir 1 by means of a bracket 20 at an upper part and a middle part of the storage box 19.

In an embodiment, the drive mechanism includes a first motor 24, a first pulley 22, and a second pulley 25. The first pulley has a diameter greater than that of the second pulley, and the first pulley is fixedly disposed on a rotation shaft at the right end of the first roller. The second pulley is fixedly disposed on a rotation shaft at a right end of the second roller, and the first pulley and the second pulley are connected by means of a timing belt 23. An output shaft of the first motor is coaxially connected with the rotation shaft 35 at the right end of the second roller. The first motor 24 is electrically connected with the controller. In an embodiment, the first roller and the second roller are driven by the first motor. It is understandable that the right end of the first roller 27 can be provided with a cigarette holding groove baffle 34 to prevent the cigarettes from sliding out, and the first pulley can be fixedly disposed on the rotation shaft at one end of the first roller 27 provided with the cigarette holding groove baffle 34.

A rotation speed ratio of the first pulley 22 to the second pulley 25 may be 1:2. That is, the first pulley may have a diameter that is twice that of the second pulley. Therefore, when the second roller 30 turns a circle, the first roller 27 turns half a circle, such that when one cigarette is removed by the second roller 30, two cigarettes are removed by the first roller 27, thereby improving a success rate of removal of cigarettes and avoiding the phenomenon of cigarette jams. If there is no cigarette jams, the cigarettes can be successfully removed by the first roller 27 every time, as a result of which the cigarettes are kept in the cigarette holding grooves 29 and rotate with the push cylinder 192 to reach an upper end of the storage channel 193. If the storage channel 193 is completely filled with cigarettes, the cigarettes in the cigarette holding grooves 29 will remain to rotate in the push cylinder 192. Since the storage channel 193 has a width for placing only one cigarette, when one cigarette is going to be removed by the second roller 30, no cigarette jams would occur in the storage channel 193.

Figure 11:
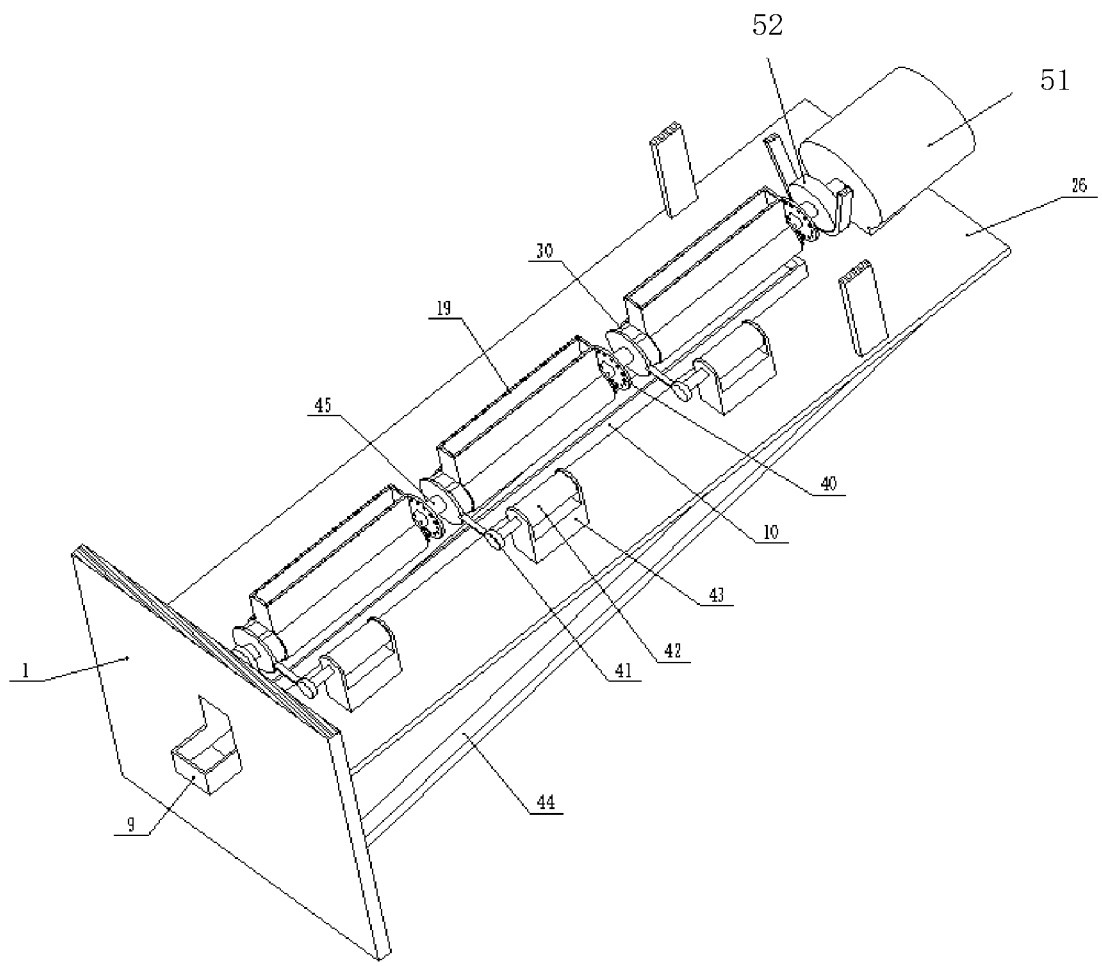
FIG. 11 is a schematic diagram of three discharge devices in accordance with an embodiment described herein.
Figure 12:
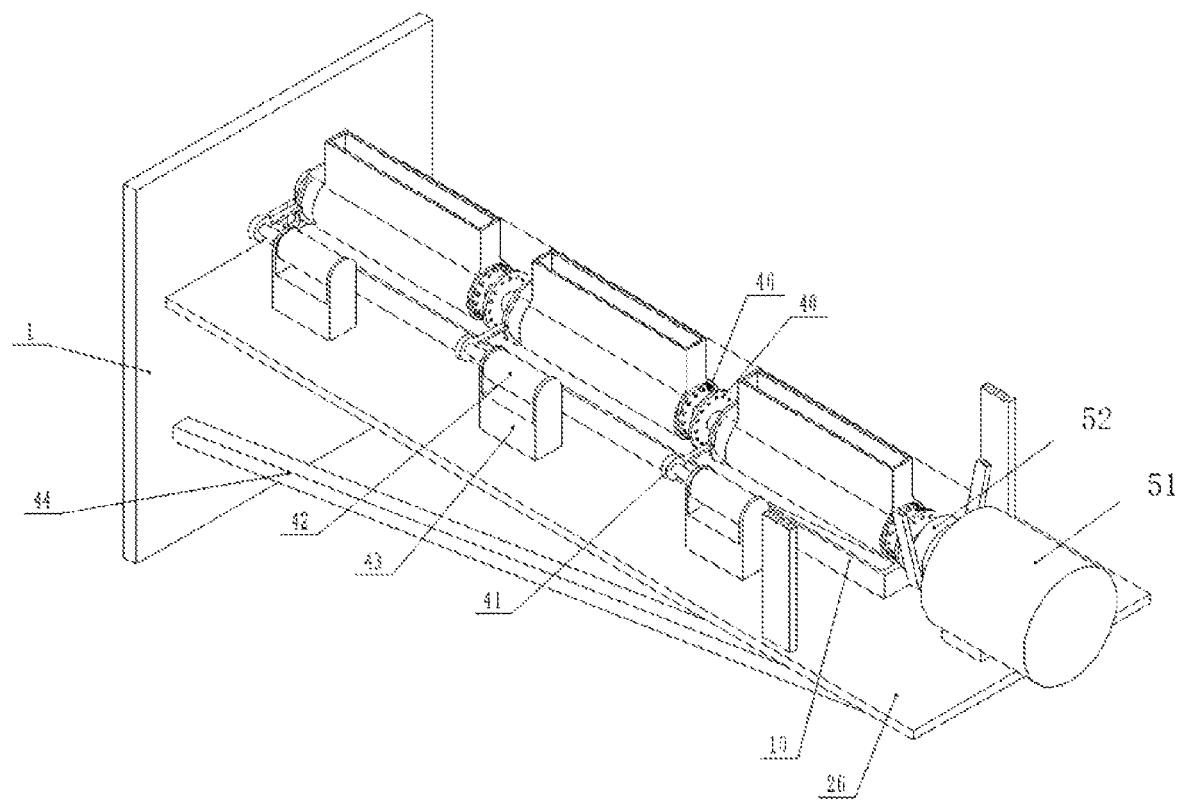
FIG. 12 is another schematic diagram of three discharge devices in accordance with an embodiment described herein.
Figure 13:
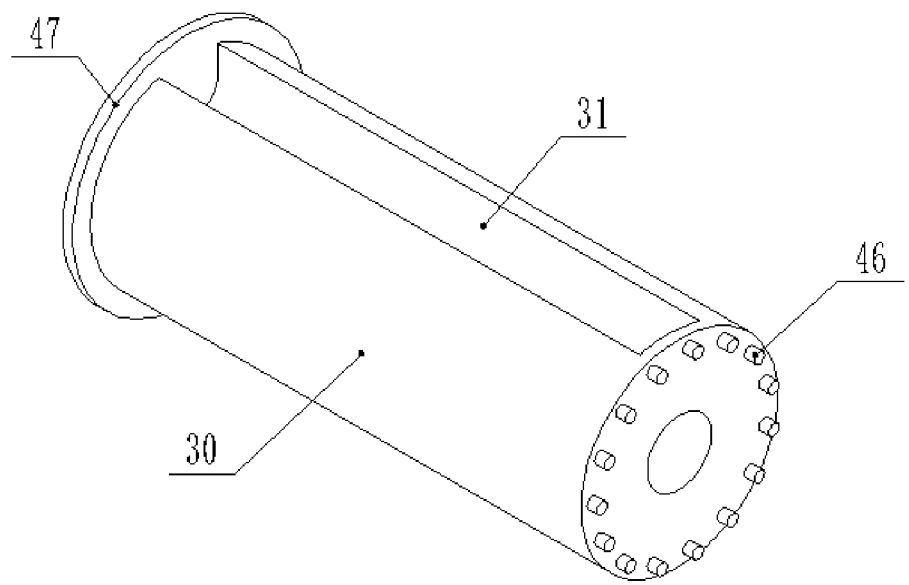
FIG. 13 is a schematic diagram of a second roller in accordance with an embodiment described herein.
Figure 14:
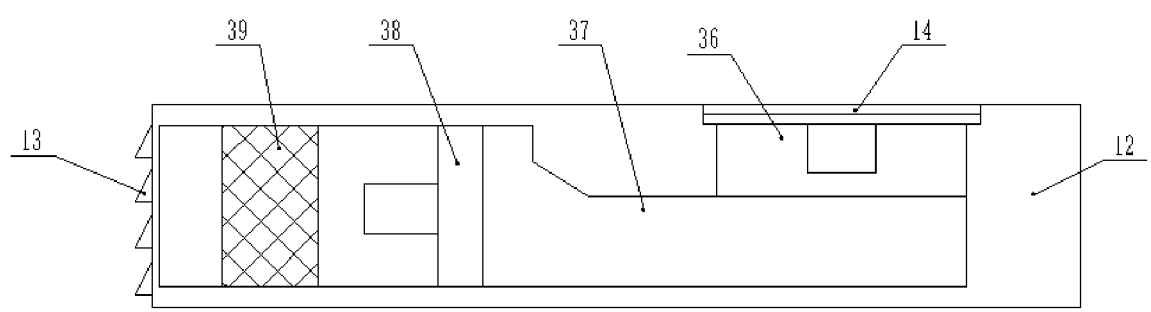
FIG. 14 is a schematic diagram of a smoke purification system in accordance with an embodiment described herein.

As shown in FIGS. 11 to 13, in an embodiment, the discharge device comprises at least two discharge devices, and each discharge device has a storage box 19 for a different specification of cigarettes. The storage box 19 is connected to a chassis 26 by a support structure. One end of the chassis is connected to the inner wall of the cigarette reservoir, and the chute 10 is disposed on the chassis 26. In an embodiment, various specifications of cigarettes can be placed in the storage boxes 19 of the discharge devices, such that a user, who is provided with a more user-friendly cigarette purchasing experience, can choose a specification of cigarettes according to his/her own preference. The discharge device may comprise three discharge devices, and the three discharge devices may be formed into a group and aligned with one chute 10. The storage boxes of the three discharge devices can be filled with normal, medium, and slim cigarettes of the same brand respectively. When a cigarette brand label is provided at the cigarette basket, the user can choose normal, medium, and slim cigarettes of the same brand according to his/her preference, such that user can get a user-friendly cigarette purchasing experience. It is understandable that reinforcement rods 44 are provided at two sides of the bottom of the chassis 26 for connecting to the inner wall of the cigarette reservoir 1, thereby improving reliability of the connection between the chassis 26 and the cigarette reservoir 1.

When the discharge device comprises at least two discharge devices, the drive mechanism includes a second motor 51, a third pulley, and a fourth pulley 52. A first roller of each discharge device is fixedly disposed on a first rotation shaft, a second roller of each discharge device is slidably sleeved on a second rotation shaft 45, the third pulley is fixedly disposed on a right end of the first rotation shaft, the fourth pulley is fixedly disposed on a right end of the second rotation shaft, and the third pulley and the fourth pulley are connected by a timing belt. The third pulley has a diameter larger than that of the fourth pulley. An output shaft of the second motor is coaxially connected with the second rotation shaft, and the second motor 51 is electrically connected to the controller. A plurality of clutch bosses are provided on a face of a right end of the second roller. A clutch disk 40 is fixedly disposed on the second rotation shaft and located between two adjacent second rollers. The clutch disk 40 is provided with a plurality of holes to be matched with the clutch bosses. A left end of the second roller is provided with a tie plate 47 protruding from the outer periphery of the second roller. An air cylinder 42 is disposed on the chassis in parallel with the second roller, a piston of the air cylinder is perpendicularly connected to one end of a tie rod 41, the air cylinder is electrically connected to the controller, and the other end of the tie rod 41 is provided with a U-shaped limit slot for accommodating the tie plate. In an embodiment, the second motor 51 drives the first and second rollers. The tie rod 41 limits a side of the tie plate 47 via the U-shaped limit slot, and the tie plate 47 can slide in the U-shaped limit slot of the tie rod 41. As the piston of the air cylinder 42 extends and retracts, the tie rod 41 can be driven to move laterally together with the tie plate 47 by the U-shaped limit slot, and hence the second roller 30 slides inside the discharge cylinder 194, so as to control a clutch action of the second roller 30 and the clutch disk 40. That is, the clutch bosses and the holes can be matched or separated. When the piston of a certain cylinder 42 retracts, a corresponding second roller 30 slides inside the discharge cylinder 194, and the clutch bosses 46 are inserted into the holes on the clutch disc 40, such that the second roller 30 is fixedly connected with the second rotation shaft 45. The second rotation shaft 45 rotates the second roller 30, such that the second roller 30 rotating in the discharge cylinder 194 removes cigarettes. It is understandable that the second roller can rotate and slide inside the discharge cylinder, the second roller 30 has a length greater than that of the discharge cylinder 194 by a value equal to a distance between the clutch disk 40 and the discharge cylinder 194, and the air cylinder 42 can be fixedly installed on an air cylinder bracket 43 fixed on the chassis 26. A rotation speed ratio of the third pulley to the fourth pulley 25 can also be 1:2. That is, the third pulley has a diameter that is twice that of the fourth pulley. Therefore, when the second roller 30 turns a circle, the first roller 27 turns half a circle, such that when one cigarette is removed by the second roller 30, two cigarettes are removed by the first roller 27, thereby effectively improving a success rate of removal of cigarettes and avoiding cigarette jams.

Figure 3:
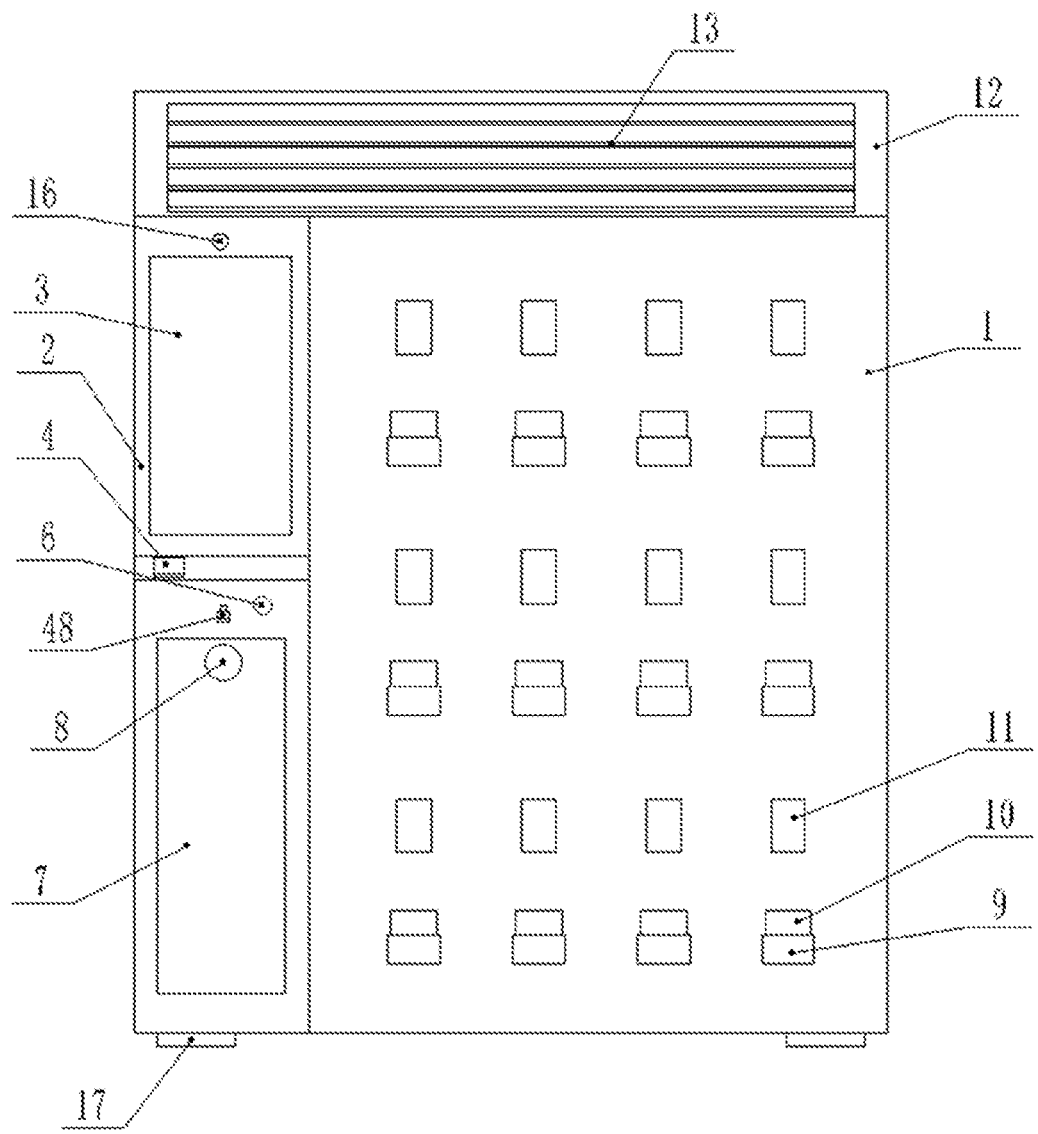
FIG. 3 is a front view of an apparatus for selling cigarettes in accordance with an embodiment described herein.
Figure 4:
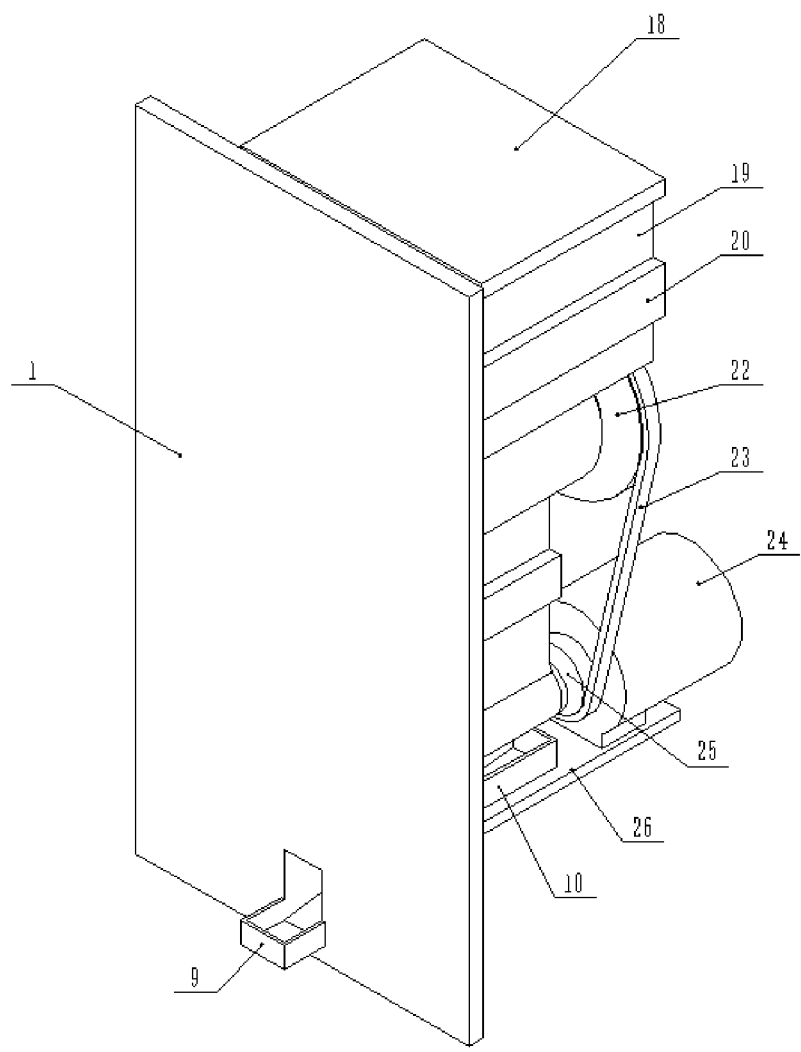
FIG. 4 is a schematic diagram of a discharge device in accordance with an embodiment described herein.
Figure 5:
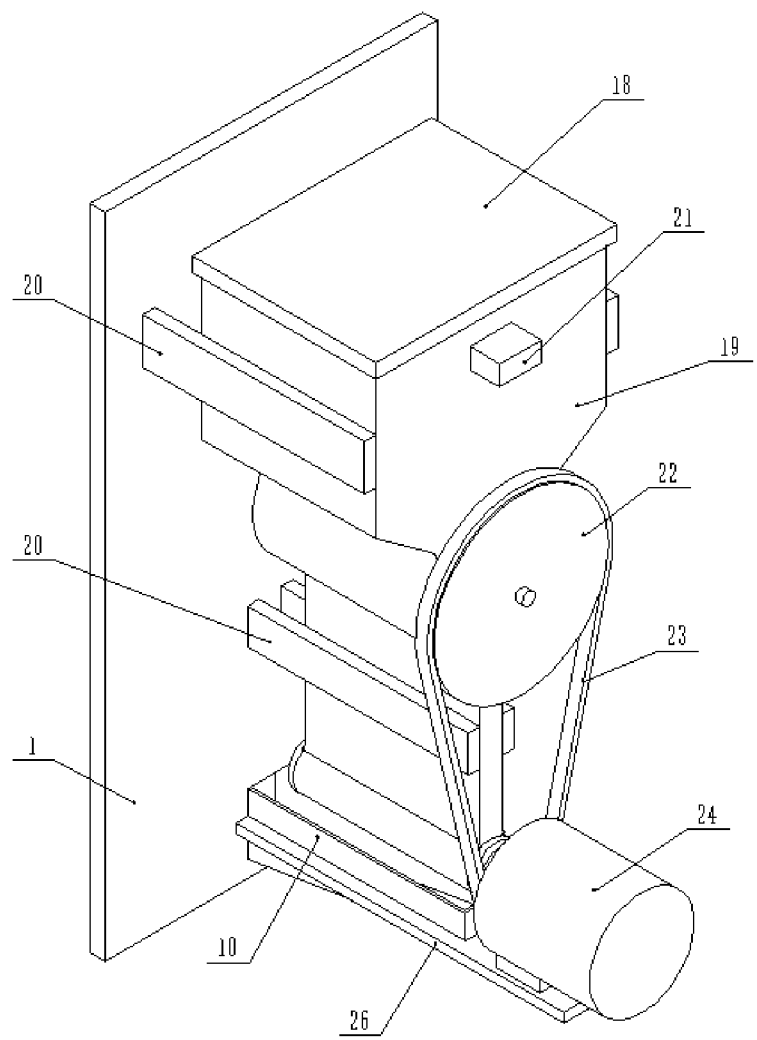
FIG. 5 is another schematic diagram of a discharge device in accordance with an embodiment described herein.
Figure 6:
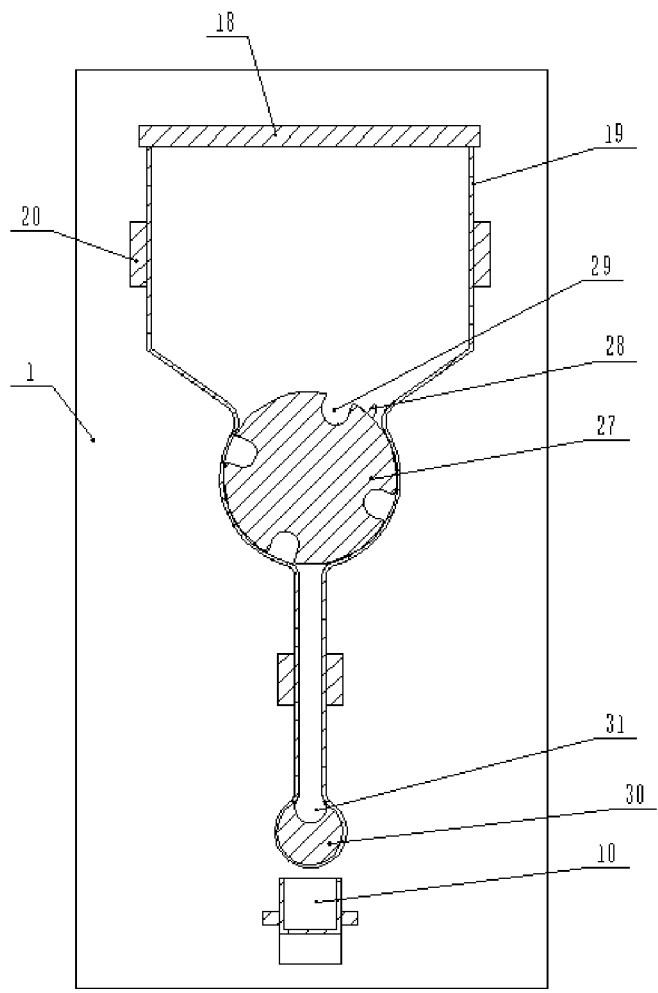
FIG. 6 is a front view of a discharge device in accordance with an embodiment described herein.
Figure 7:
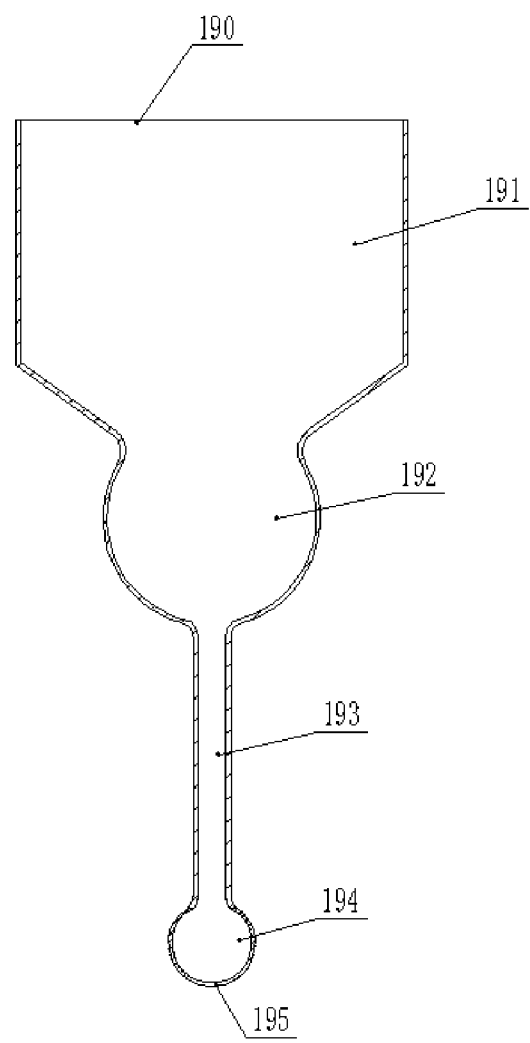
FIG. 7 is a schematic diagram of a storage box in accordance with an embodiment described herein.
Figure 8:
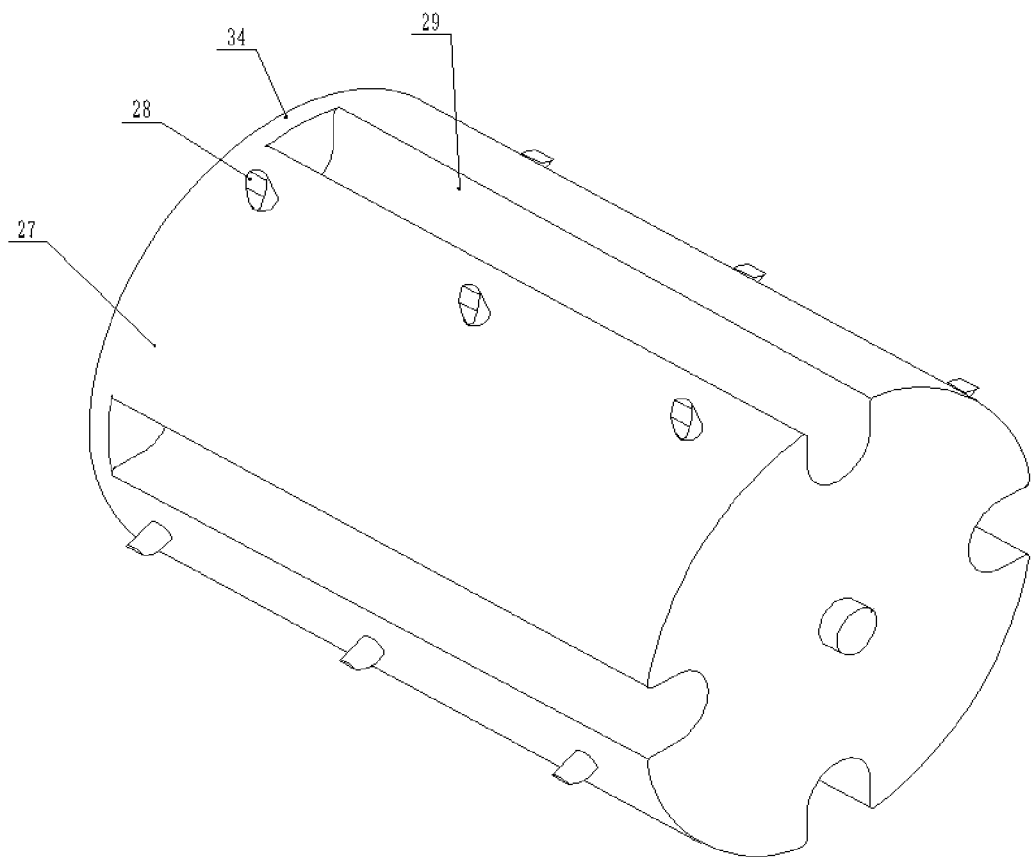
FIG. 8 is a schematic diagram of a first roller in accordance with an embodiment described herein.
Figure 9:
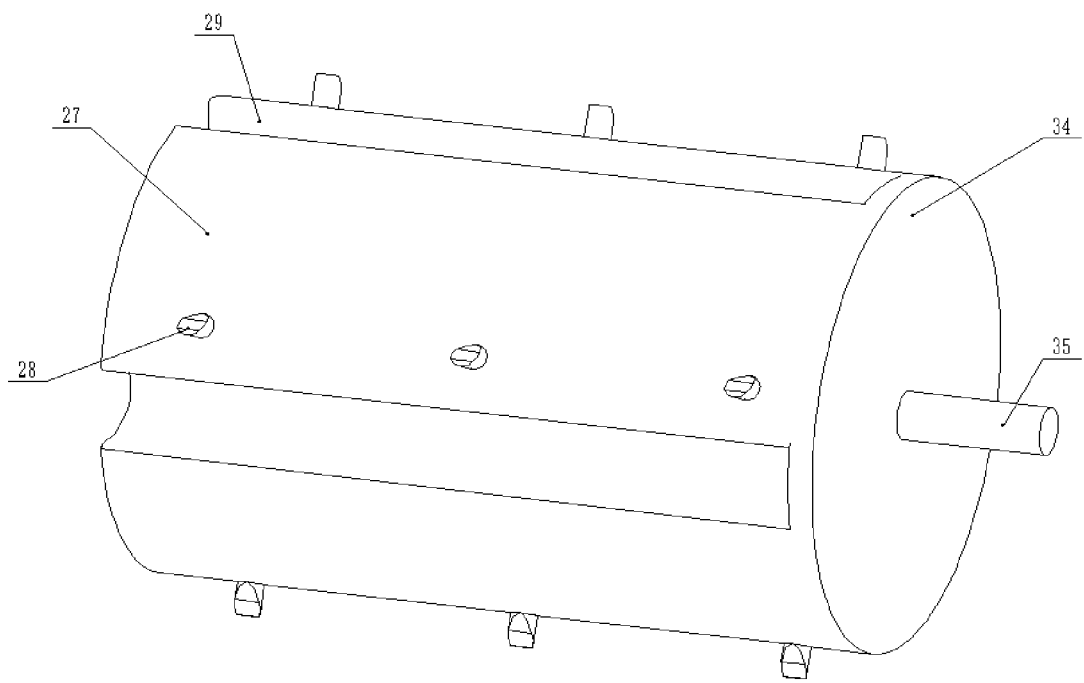
FIG. 9 is another schematic diagram of a first roller in accordance with an embodiment described herein.
Figure 10:
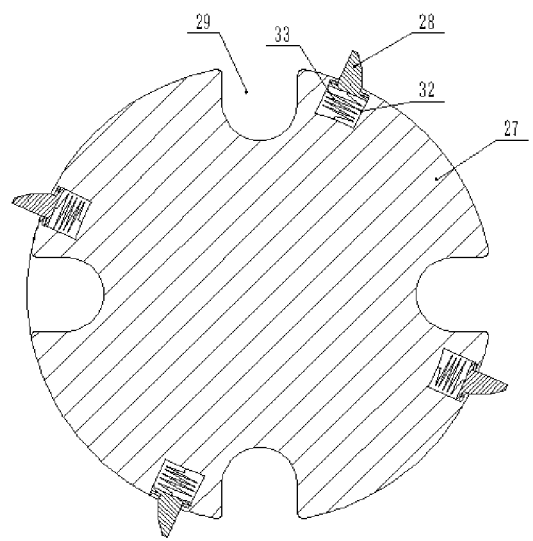
FIG. 10 is a front view of a first roller in accordance with an embodiment described herein.

As shown in FIGS. 1 and 3, a cigarette lighter 6 and a faucet 48 are provided on the front face of the control cabinet below the ID card scanner, respectively. A clean water tank is provided in the control cabinet, and a water inlet of the faucet is connected to the bottom of the clean water tank. The control cabinet is provided with a cigarette butt bin 7 on which a cigarette butt inlet 8 is disposed. An upper end of the cigarette butt inlet 8 is provided with a water opening aligned with the faucet. A waste channel inclined downwardly is provided inside the cigarette butt inlet. The water opening is coupled with the inside of the cigarette butt bin through the waste channel. In an embodiment, the cigarette lighter can be used to ignite a cigarette, the faucet can be opened to extinguish a cigarette butt, and the extinguished cigarette butt can be thrown into the cigarette butt bin through the waste channel. It is understandable the clean water tank is positioned higher than the faucet 48 for water to be flown into the faucet 48. The cigarette lighter 6 can adopt a car cigarette lighter. A disposable garbage bag can be placed and replaced in the cigarette butt bin 7. A certain amount of water from the faucet is kept in the garbage bag, such that cigarette butts thrown into the cigarette butt bin can be extinguished immediately to prevent a fire disaster. The smoker does not need to extinguish a cigarette butt by himself/herself. Also, it is convenient to clean the cigarette butt bin 7, since the management personnel only need to take the garbage bags away after a clean job.

Specifically, a plurality of exhaust grilles inclined downwardly are evenly distributed at the fresh air outlet. A sachet is disposed in the exhaust channel, so as to improve the air quality in the smoking room. It is understandable that the extraction device 36 and the exhaustion device 38 can be electrically connected to a power socket 5 provided on the control cabinet and the power socket 5 is connected to an external power supply. Since smoke is easy to float upwardly, the air inlet 14 is provided at an upper end of the smoke purification system 12 to suck in the air in the upper space of the smoking room. The fresh air outlet 13 is disposed at a front end of the smoke purification system 12, and filtered fresh air is blown downwardly to cycle the air in the smoking room, thereby contributing to air purification. Another sachet 39 is placed between the fresh air outlet 13 and the exhaustion device 38. The smoke purifier 37 can adopt activated carbon combined with the sachet 39 to absorb and neutralize the smell of the smoke in the smoking room, thereby improving the air quality in the smoking room.

The smoke purification system 12 can suck and filter the air in the upper space of the smoking room and blow the filtered air out downwardly to cycle the air rapidly. The sachet then provides aroma to neutralize the smell of the smoke in the smoking room. Smoked cigarettes can be thrown into the cigarette butt bin to keep the smoking room clean. The cigarette lighter can then be provided at special sites such as airports where no lighters are allowed to be carried.

A system may be provided for accessing cigarettes. The system may include an authentication module for identification, a central control module, a cigarette selection module, a payment module, and a big data collection module. The authentication module, the cigarette selection module, the payment module, and the big data collection module are communicatively coupled with the central control module. The cigarette selection module is used for a smoker to perform a cigarette selection operation, the payment module is used for the smoker to perform a payment operation, the big data collection module is used for collecting a placement point of an apparatus for selling cigarettes, ages of smokers, and the number of cigarettes of different brands consumed by the smokers. In an embodiment, the authentication module is used for the smoker to scan his/her ID card by means of the ID card scanner 4 or enter his/her ID number (and provide his/her facial information). If the smoker is an adult, he/she can proceed to a next step of operation. If the smoker is a minor, he/she can't proceed to the next step of operation, since it's strictly forbidden for minors to buy cigarettes. The big data collection module is also used for collecting information regarding the number of cigarettes consumed by adult smokers of different ages and their favorite brands, respectively. If the smoker doesn't carry his/her ID card, he/she can enter ID number to the touch-screen display 3 and provides his/her facial information to the camera 16 to confirm that he/she is the person, and then the smoker can proceed to the next step of operation. The authentication module is connected to the central control module to transmit identity information to the central control module. The central control module includes the controller in the intelligent control cabinet 2. The controller can adopt a single-chip microcomputer chip or an ARM chip. The central control module is also connected to the cigarette selection module, the payment module and the big data collection module. The cigarette selection module and the payment module can be implemented by the touch-screen display 3. The payment module can recognize a QR code. The big data collection module is used for collecting a placement point of an apparatus for selling cigarettes, ages of smokers and the amount of brands of cigarettes consumed by the smokers, such that the number of smokers in each location and of each age and brands of cigarettes liked by the smokers can be collected statistically, and sales of each brand of cigarettes consumed by the public and an overall cigarette consumption are provided to cigarette manufacturers as important data. The controller of the central control module is electrically connected to the first motor 24 or the second motor to control of a start, stop and rotation of the first motor 24 or the second motor.

The above are only example embodiments. It should be noted that these examples are only used for illustration purposes and not to limit the scope of the disclosure. Moreover, various changes or modifications can be made to the examples by those skilled in the art who have read the content of the disclosure, and these changes, modifications or their equivalent forms also fall within the scope defined by the appended claims.

The invention claimed is:
1. An apparatus for selling cigarettes, comprising:
a vending machine; and
a smoke purification system configured to be placed at a top of the vending machine;
wherein the smoke purification system comprises a housing, a smoke extraction device, a smoke purifier, and a smoke exhaustion device, the housing configured to host the smoke extraction device, the smoke purifier, and the smoke exhaustion device;

wherein an upper face of the housing comprises an air inlet, and a front face of the housing comprises a fresh air outlet, the air inlet configured to be coupled with an intake port of the extraction device, wherein the extraction device withdraws air from a surrounding environment through the air inlet; and wherein an escape port of the smoke exhaustion device is coupled with the fresh air outlet through an exhaust channel, and two ends of the smoke purifier are configured to be coupled with an escape port of the smoke extraction device and an intake port of the smoke exhaustion device, respectively.

2. The apparatus of claim 1, wherein a plurality of exhaust grilles inclining downwardly are evenly distributed at the fresh air outlet, and a sachet is disposed within the exhaust channel.

3. The apparatus of claim 1, wherein:

the vending machine comprises a cigarette reservoir for holding the cigarettes and a control cabinet configured to be placed laterally to the cigarette reservoir, a front face of the control cabinet comprising a touch-screen display, a camera located above the touch-screen display, and an identification (ID) card scanner located below the touch-screen display;

the control cabinet is configured to house a controller that is electrically connected to the touch-screen display, the camera, and the ID card scanner;

a front face of the cigarette reservoir comprises a cigarette outlet and a cigarette basket, one side of the cigarette basket comprising an opening that is coupled with the cigarette outlet, and an upper end of the cigarette basket comprising a cigarette exit;

the cigarette reservoir is configured to house a chute, a base plate of the chute inclining downwardly and the chute extending through the cigarette outlet into the cigarette basket; and the cigarette reservoir is further configured to house a first discharge device configured to discharge the cigarettes, the first discharge device being electrically connected to the controller and comprising a discharge opening located directly above the chute.

4. The apparatus of claim 3, wherein a plurality of exhaust grilles inclining downwardly are evenly distributed at the fresh air outlet, and a sachet is disposed within the exhaust channel.

5. The apparatus of claim 3, wherein:

the first discharge device comprises a first storage box, a first roller, and a second roller;

the first storage box is vertically disposed on an inner wall of the cigarette reservoir, the first storage box comprising a tank, a push cylinder, a storage channel, and a discharge cylinder that are coupled with one another sequentially from top to bottom, the top of the tank comprising a storage opening;

the discharge cylinder comprises a discharge opening at the bottom of the discharge cylinder;

the first roller has a diameter larger than that of the second roller, the first roller housed within the push cylinder, four cigarette holding grooves being evenly distributed on an outer periphery of the first roller, and each of the four cigarette holding grooves extending in an axial direction of the first roller and configured to hold a respective cigarette;

the first roller is rotatably matched with an inner periphery of the push cylinder, a right end of the first roller being connected with a drive mechanism that electrically coupled with the controller, and the drive mechanism configured to cause the first roller to rotate; and the second roller is disposed within the discharge cylinder, an outer periphery of the second roller comprising a cigarette transferring groove that extends in an axial direction of the second roller, the second roller being rotatably matched with an inner periphery of the discharge cylinder, and the drive mechanism further configured to cause the second roller to rotate.

6. The apparatus of claim 5, wherein a plurality of exhaust grilles inclining downwardly are evenly distributed at the fresh air outlet, and a sachet is disposed within the exhaust channel.

7. The apparatus of claim 5, wherein four spring holding grooves parallel and adjacent to the cigarette holding grooves are evenly distributed on the outer periphery of the first roller, each of the spring holding grooves is configured to hold a respective spring, one end of the spring is connected to the bottom of the spring holding groove, the other end of the spring is connected to the bottom of a push block, and a side of the push block away from the cigarette holding groove is formed as an inclined surface.

8. The apparatus of claim 7, wherein a plurality of exhaust grilles inclining downwardly are evenly distributed at the fresh air outlet, and a sachet is disposed within the exhaust channel.

9. The apparatus of claim 5, wherein the drive mechanism comprises a first motor, a first pulley, and a second pulley, the first pulley has a diameter greater than that of the second pulley, the first pulley is fixedly disposed on a rotation shaft at a right end of the first roller, the second pulley is fixedly disposed on a rotation shaft at a right end of the second roller, the first pulley and the second pulley are connected by means of a timing belt, an output shaft of the first motor is coaxially connected with the rotation shaft at the right end of the second roller, and the first motor is electrically connected with the controller.

10. The apparatus of claim 9, wherein a plurality of exhaust grilles inclining downwardly are evenly distributed at the fresh air outlet, and a sachet is disposed within the exhaust channel.

11. The apparatus of claim 5, wherein the cigarette reservoir is further configured to house a second discharge device, the second discharge device comprises a second storage box, the first storage box of the first discharge device and the second storage box of the second discharge device are configured for cigarettes of respective specifications, the first storage box and the second storage box are connected to a chassis by respective support structures, one end of the chassis is connected to the inner wall of the cigarette reservoir, and the chute is disposed on the chassis.

12. The apparatus of claim 11, wherein a plurality of exhaust grilles inclining downwardly are evenly distributed at the fresh air outlet, and a sachet is disposed within the exhaust channel.

13. The apparatus of claim 11, wherein:

the drive mechanism comprises a second motor, a third pulley, and a fourth pulley;

a first roller of each of the first discharge device and the second discharge device is fixedly disposed on a first rotation shaft;

a second roller of each of the first discharge device and the second discharge device is slidably sleeved on a second rotation shaft;

the third pulley is fixedly disposed on a right end of the first rotation shaft;

the fourth pulley is fixedly disposed on a right end of the second rotation shaft;

the third pulley and the fourth pulley are connected by a timing belt, the third pulley having a diameter larger than that of the fourth pulley;

an output shaft of the second motor is coaxially connected with the second rotation shaft, the second motor being electrically connected to the controller;

a plurality of clutch bosses are disposed on a face of the right end of the second roller, a clutch disk being fixedly disposed on the second rotation shaft and located between two adjacent second rollers;

a plurality of holes to be matched with the clutch bosses are disposed on the clutch disk;

a left end of the second roller comprises a tie plate protruding from the outer periphery of the second roller; and an air cylinder is disposed on the chassis in parallel with the second roller, a piston of the air cylinder being perpendicularly connected to one end of a tie rod, the other end of the tie rod comprising a U-shaped limit slot for accommodating the tie plate, and the air cylinder being electrically connected to the controller.

14. The apparatus of claim 13, wherein a plurality of exhaust grilles inclining downwardly are evenly distributed at the fresh air outlet, and a sachet is disposed within the exhaust channel.

15. The apparatus of claim 3, wherein:
the front face of the control cabinet further comprises a cigarette lighter and a faucet respectively located below the ID card scanner;
the control cabinet is configured to house a clean water tank;
a water inlet of the faucet is connected to the bottom of the clean water tank; and
the control cabinet further comprises a cigarette butt bin on which a cigarette butt inlet is disposed, an upper end of the cigarette butt inlet being provided with a water opening aligned with the faucet, a waste channel inclining downwardly being provided inside the cigarette butt inlet, and the water opening being coupled with the inside of the cigarette butt bin through the waste channel.

16. The apparatus of claim 15, wherein a plurality of exhaust grilles inclining downwardly are evenly distributed at the fresh air outlet, and a sachet is disposed within the exhaust channel.

* * * * *